United States Patent [19]

Brown et al.

[11] Patent Number: 5,309,028

[45] Date of Patent: May 3, 1994

[54] CALL COVERAGE ARRANGEMENT IN AN ISDN SWITCHING SYSTEM

[75] Inventors: Louis D. Brown, Clarendon; Jeffery M. Dement, Hoffman Estates, both of Ill.

[73] Assignee: AT&T Bell Laboratories, Murray Hill, N.J.

[21] Appl. No.: 913,561

[22] Filed: Jul. 14, 1992

[51] Int. Cl.⁵ .................. H04M 3/42; H04M 1/00; H04M 3/00; H04Q 11/04

[52] U.S. Cl. ..................... 379/201; 379/252; 379/164; 379/165; 370/62

[58] Field of Search ............... 379/136, 164, 165, 214, 379/247, 267, 308, 309, 201; 370/62

[56] References Cited

U.S. PATENT DOCUMENTS

| | | | |
|---|---|---|---|
| 4,150,257 | 4/1979 | Fenton et al. | 379/211 |
| 4,296,282 | 10/1981 | O'Neil et al. | 379/164 |
| 4,567,324 | 1/1986 | Smith et al. | 379/214 |
| 4,723,273 | 2/1988 | Diesel et al. | 379/211 |
| 4,790,004 | 12/1988 | Nalbone | 379/214 |
| 4,873,717 | 10/1989 | Davidson | 379/157 |

OTHER PUBLICATIONS

Definity and System 85 Feature Descriptions, vol. 1, 555-104-301, Issue 1, Aug. 1989, pp. 26-1-26-28, 114-1, 114-2, 24-1-24-10.

Definity and System 75 and System 75 XE Feature Description, Communications System, Generic 1, 555-200-201, Issue 5, Feb. 1989, pp. 2-121-3-126.

5ESS(©) Switch Custom ISDN Basic Rate Interface Specification, 5E8 Software Releasee, AT&T 235-90-0-343, Issue 1.00, Dec. 1991.

Primary Examiner—James L. Dwyer
Assistant Examiner—Daniel S. Hunter
Attorney, Agent, or Firm—Ross T. Watland

[57] ABSTRACT

A call coverage arrangement where a covering terminal has, for each covered terminal, a single monitor lamp that not only indicates the overall or collective busy or idle status of the call appearances on the covered terminal but also the collective ringing status. Distinct visual signals are provided at the monitor lamp to indicate either a ringing while idle or a ringing while busy status. This allows all calls to be answered promptly and efficiently by a secretary in a manner which, from a human factors standpoint, is similar to the call coverage provided with key systems.

2 Claims, 9 Drawing Sheets

CALL COVERAGE ARRANGEMENT IN AN ISDN SWITCHING SYSTEM

TECHNICAL FIELD

This invention relates to telecommunications.

BACKGROUND AND PROBLEM

Telecommunications arrangements for businesses encourage productivity by enabling terminals to originate and terminate multiple calls simultaneously. For example, calls may be offered to a terminal when the user of the terminal is dialing a directory number or is active on another call. This eliminates the need for call waiting service and provides the user flexibility in choosing the call to handle next. In such an arrangement, each terminal has visual indicators, referred to as call appearances, for informing the user about the status of each call. Several, or even all, of the call appearances on a terminal may represent the same directory number. Furthermore, terminals may share call appearances. Calls alerting at a call appearance may be answered at any of the terminals that share the call appearance.

Shared call appearances are often used to provide call coverage. The terminal for a secretary who answers calls for several executives would include call appearances for the secretary's directory number and shared call appearances for the executives' directory numbers. If all the call appearances on the executives' terminals appeared on the secretary's terminal, the secretary could determine whether an executive's terminal was off-hook merely by glancing at the corresponding shared call appearances. However, since each executive's terminal is likely to have multiple call appearances, putting all the call appearances on the secretary's terminal is impractical. Instead, often only one call appearance of the executive's directory number appears on the secretary's terminal. The problem with this is that status information for the other call appearances is not available at the secretary's terminal so the secretary does not know whether the executive's terminal is off-hook. For example, assume a call from an important client arrives for an executive and the secretary answers the call. Meanwhile, the executive is off-hook and busy with a call on a call appearance that is not displayed on the secretary's terminal. The secretary, assuming that the executive is away from the desk, merely takes a message. Although the secretary quickly relays the message to the executive, the executive is unable to reach the client and loses an important business opportunity. In contrast, if the secretary's terminal had displayed information about the executive's other call appearances, the secretary would have recognized that the executive was on the phone and could be interrupted.

U.S. Pat. No. 4,873,717 issued to W. A. Davidson et al. on Oct. 10, 1989, discloses a call coverage arrangement in which coverage personnel are informed of the switch-hook status of covered terminals by way of a single two-part indicator on the covering terminal. The two-part indicator indicates switch-hook status for any one of a number of covered terminals. The first part of the indicator identifies the covered terminal and the second part defines the switch-hook status of the identified terminal. This arrangement does, however, require the use of shared call appearances to allow an incoming call to a covered terminal to ring and then be answered at a covering terminal. Shared call appearances are expensive to implement because of the required use of bridging circuits.

Telephone key systems have long been used to provide call coverage. Although key systems have the disadvantage of requiring additional adjunct equipment as well as many communication lines connected to each telephone, their operation from a human factors standpoint is considered to be highly desirable, particularly by experienced users.

In view of the foregoing, a need exists in the art for a call coverage arrangement which does not require large numbers of call appearances on a covering terminal or that call appearances be shared, bridged, or interconnected, but which allows calls to be answered promptly and efficiently and in a manner similar to the way calls are answered with key systems.

SOLUTION

This need is met and a technical advance is achieved in accordance with the principles of the invention in an exemplary call coverage arrangement where a covering terminal has, for each covered terminal, a single monitor lamp that not only indicates the overall or collective busy or idle status of the call appearances on the covered terminal but, importantly, also the collective ringing status. Significantly, distinct visual signals are provided at the monitor lamp to indicate either a ringing while idle or a ringing while busy status. This allows all calls to be answered promptly and efficiently by a secretary in a manner which, from a human factors standpoint, is similar to the call coverage provided with key systems. A principal can have all of his calls covered by his personal secretary, rather than being routed to backup coverage when the secretary is busy on another call. Backup secretaries would only answer after sufficient time that the personal secretary is unlikely to answer. The calls are offered to both the covered and covering terminal at the same time. The secretary can answer promptly after observing the monitor lamp and noting that the principal is busy on another call. The secretary will also observe when the principal terminates the other call so that the call can be transferred back to the principal if desired. There is no need to have call appearances that are shared, bridged or interconnected.

A method in accordance with the invention is used in an arrangement for providing call coverage by a covering terminal for a covered terminal having a plurality of call appearances none of which is shared, bridged, or interconnected with any call appearance of the covering terminal. The covering terminal indicates a collective idle status of the plurality of call appearances of the covered terminal. The covering terminal indicates a collective ringing status of the plurality of call appearances of the covered terminal. The covering terminal indicates a collective busy status of the plurality of call appearances of the covered terminal.

Illustratively, the covering terminal provides a first visual signal, e.g., a flashing lamp, indicating a collective ringing while idle status, and a second distinctive visual signal, e.g., a fluttering lamp, indicating a collective ringing while busy status. In both cases an audible ping ring signal is also generated. A ringing signal is contemporaneously generated at the covered terminal.

A collective idle status is determined when none of the plurality of call appearances of the covered terminal has an active call or an incoming call. A collective ringing while idle status is determined when any one of the plurality of call appearances of the covered terminal has an incoming call and none of the other call appearances has an active call. A collective ringing while busy status is determined when any one of the plurality of call appearances has an incoming call and any one of the others has an active call. A collective busy status is determined when any one of the plurality of call appearances has an active call and none of the others has an incoming call. In the illustrative embodiment, at least one of the plurality of call appearances is for a first directory number and at least one of the other call appearances is for a second directory number. The terminals are connected to an integrated services digital network (ISDN) switching system via ISDN digital subscriber lines. The status determinations are performed by the switching system and the necessary communications to and from the terminals are effected using D-channels of the ISDN lines.

Contemporaneously with the indication at the covering terminal of either a collective ringing while idle status or a collective ringing while busy status, caller identification information is displayed at the covered terminal. Call pickup of the incoming call may be initiated at the covering terminal by pressing a call pickup button followed by speed dialing the directory number of the covered terminal. After call pickup is initiated, caller identification information is displayed at the covering terminal.

DETAILED DESCRIPTION

Figure 1:
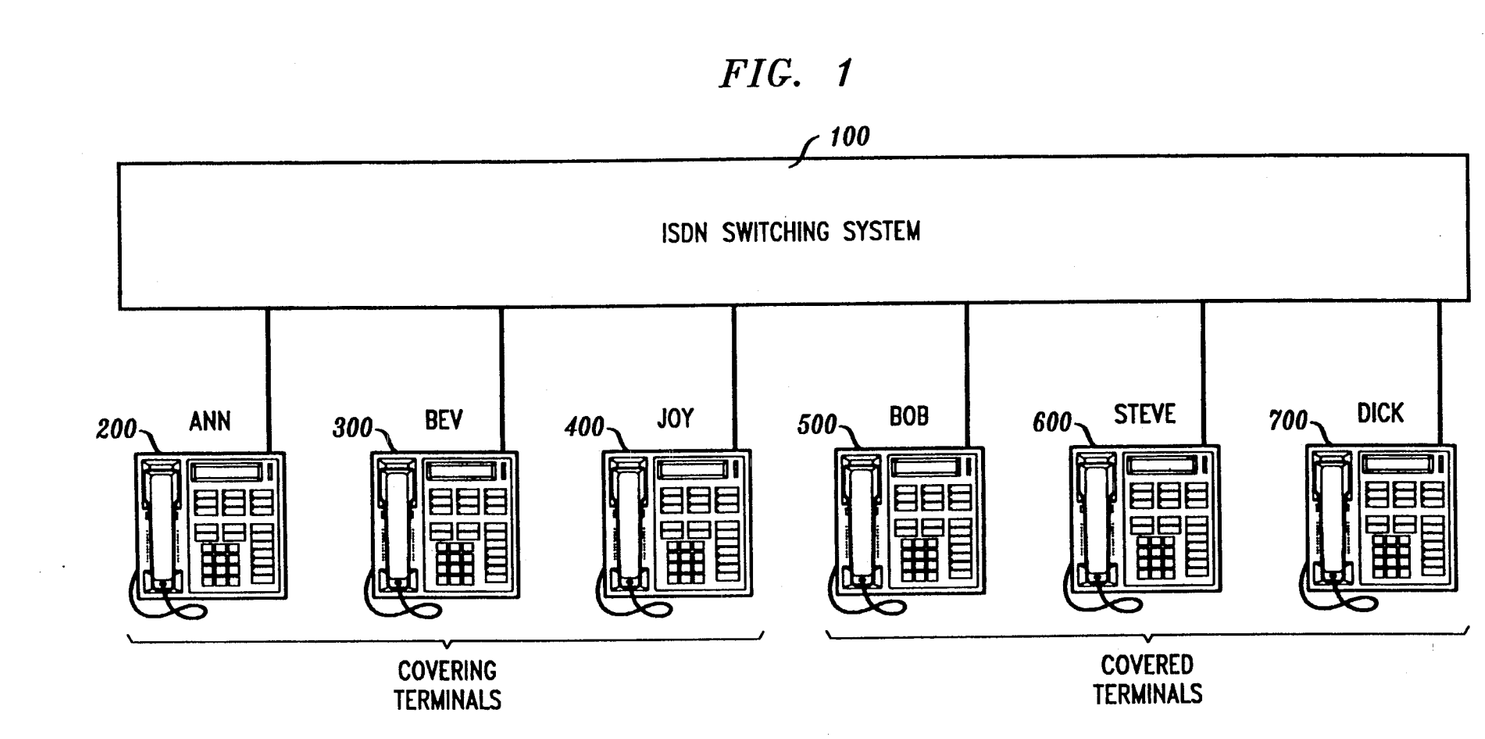
FIG. 1 is a diagram of an exemplary call coverage arrangement in accordance with the present invention.

The principles of the present invention are described in the context of an integrated services digital network (ISDN) switching system 100 (FIG. 1). An integrated services digital network is defined as a network evolved from the telephony integrated digital network that provides end-to-end digital connectivity to support a wide range of services, including voice and non-voice services, to which users have access by a limited set of standard multipurpose customer interfaces. One example of ISDN switching system 100 is the integrated packet switching and circuit switching system disclosed in U.S. Pat. No. 4,592,048 issued to M. W. Beckner et al. on May 27, 1986. Switching system 100 includes a switching network, which represents, in the above-referenced exemplary integrated packet switching and circuit switching system, a plurality of time-slot interchange units and a time-multiplexed switch to provide circuit-switched connections, and a plurality of packet switching units (interconnected via the time-slot interchange units and time-multiplexed switch) to provide packet-switched connections. Switching system 100 further includes a control arrangement including a central control and a plurality of control units that intercommunicate via predetermined channels of the time-multiplexed switch and a control distribution unit.

Also shown in FIG. 1 are six ISDN user terminals 200, 300, 400, 500, 600, 700, which are connected to switching system 100 via associated digital subscriber lines. Although only six such terminals are explicitly shown, it is understood that switching system 100 interconnects a larger plurality of ISDN terminals and may interconnect conventional analog station sets as well.

Figure 2:
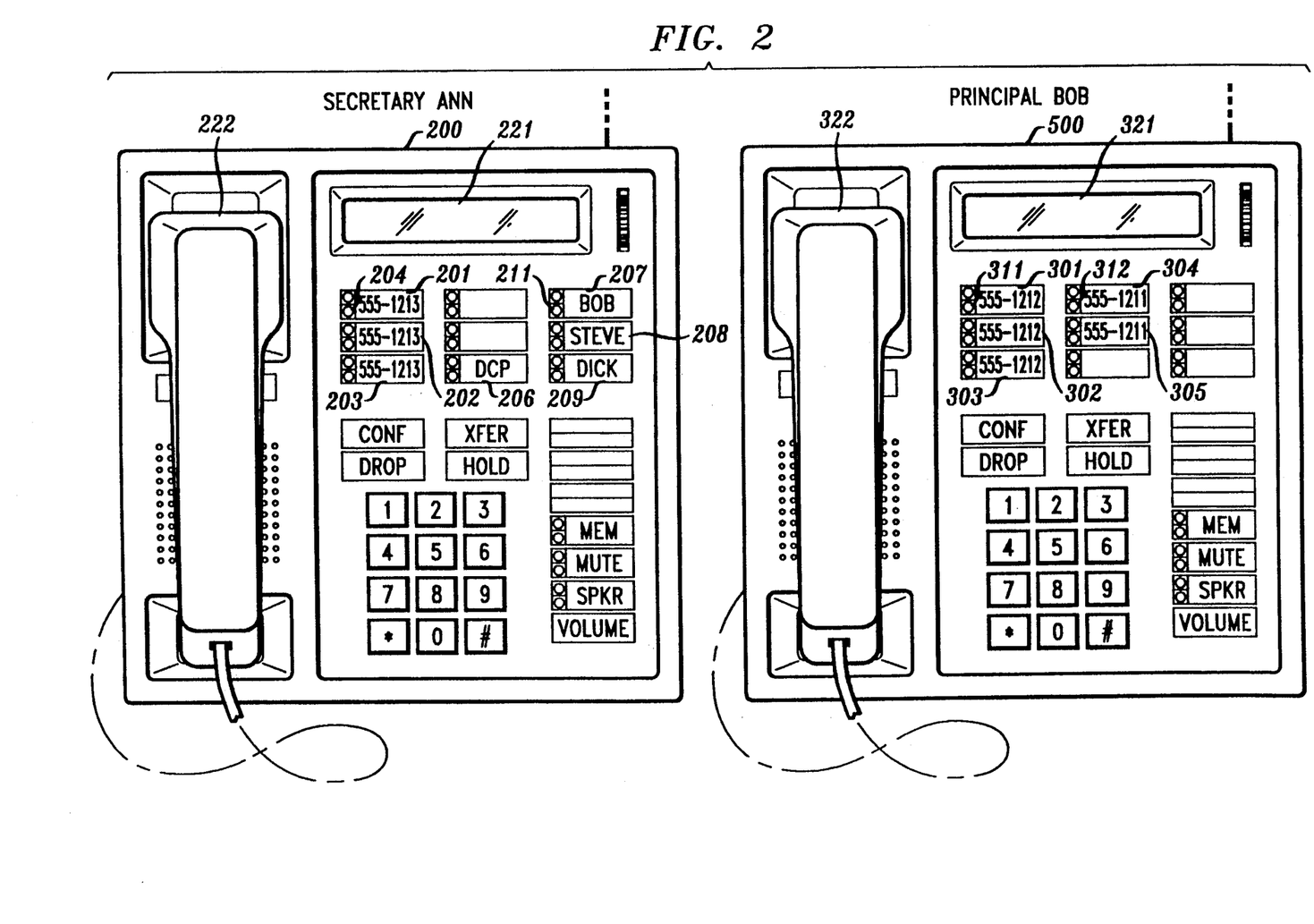
FIG. 2 is a more detailed drawing of two of the terminals included in the arrangement of FIG. 1.

As shown in FIG. 2, ISDN user terminal 200 (secretary Ann) includes a handset 222, a display 221, three call appearances 201–203, a directed call pickup feature button 206, three monitor feature buttons 207 (principal Bob), 208 (principal Steve), 209 (principal Dick), and status lamps 204 and 211 associated with buttons 201 and 207, respectively. ISDN user terminal 500 (principal Bob) includes a handset 322, a display 321, five call appearances 301–305, and status lamps 311 and 312 associated with buttons 301 and 304, respectively. Note that Bob has five call appearances on his terminal 500 (FIG. 2); three appearances 301, 302, and 303 of directory number (DN) 1212 and two appearances 304, 305 of his personal DN 1211. Ann has three appearances 201, 202, 203, of DN 1213 on her terminal 200.

Each ISDN user terminal, e.g., 200, transmits information to and receives information from switching system 100 (FIG. 1) via a basic rate interface (BRI) in two 64 kilobits per second channels referred to as B-channels and in one 16 kilobits per second channel referred to as a D-channel. In the present embodiment, one B-channel is used to convey digitized voice samples at the rate of 8000, eight-bit samples per second and the other B-channel is used to convey data at a rate of 64 kilobits per second. (However, each B-channel could be used for either voice or data traffic.) Each B-channel is separately circuit-switched by switching system 100 to other station equipment (either ISDN or analog). The D-channel is used both to convey signaling packets to effect message signaling between ISDN user terminals and a control arrangement (not shown) in switching system 100, and to convey data packets between different ISDN user terminals. The D-channel is packet-switched by switching system either to other ISDN user terminals, or to the control arrangement which controls the establishment of both circuit-switched calls and packet-switched calls within switching system 100.

Signaling packets are conveyed between the user terminals and the control arrangement enclosed in level 2 (link-level) frames in accordance, for example, with the standard LAPD protocol. The exemplary signaling messages used for the control of circuit-switched voice calls are in accordance with CCITT Recommendation Q.931.

The call coverage feature of the present invention allows a user (secretary Ann) to monitor the status of other ISDN terminals (principals Bob, Steve, Dick) using a single feature button for each telephone being monitored. Multiple terminals may be monitored by a single terminal but each requires a separate indicator on the monitoring terminal. The focus of this feature is to monitor the collective status of all the call appearances on a terminal as opposed to the individual status of each call appearance. Regardless of the number of ISDN call appearances or directory numbers assigned to a monitored telephone, the single indicator on the monitoring terminal responds to status indications from any call appearance on the monitored terminal based on Table 1.

TABLE 1

| Collective Status Indicator Functions | |
|---|---|
| Collective Status (Covered Terminal) | Indicator (Covering Terminal) |
| Idle | Off |
| Ringing While Idle | Flashing |
| Busy &/or Held | Steady |
| Ringing with Busy &/or Held | Flutter |

This feature allows a secretary or a backup secretary to know the status of a covered terminal and to "promptly" answer any ringing incoming calls regardless of the status of the covered terminal. An alerting ring may optionally be provisioned to audibly alert the secretary of an incoming call. Using the transfer feature in conjunction with the "built in" speed dial capability of the feature button, the monitoring party may easily transfer calls or dial to the covered terminal.

The following scenario is an example of the primary attributes of the call coverage feature.

SCENARIO CONFIGURATION

Three principals each have a personal secretary. The principals expect their secretaries to promptly cover their calls when they are out of the office, busy on another call, or busy with a client in their office. They all normally want the opportunity to answer their own calls during the first one or two rings prior to the secretary answering. Each secretary Ann, Bev, and Joy has three monitor feature buttons and three monitor lamps to indicate the collective status of the call appearances on Bob's terminal 500, Steve's terminal 600, and Dick's terminal 700. The directory numbers associated with the six terminals are shown in Table 2. None of the call appearances are shared, bridged, or interconnected.

TABLE 2

| TERMINAL | DIRECTORY NUMBER |
|---|---|
| Principal Bob | DN 1212 & DN 1211 |
| Principal Steve | DN 2000 |
| Principal Dick | DN 3000 |
| Secretary Ann | DN 1213 |
| Secretary Bev | DN 1214 |
| Secretary Joy | DN 1215 |

Figure 3A:
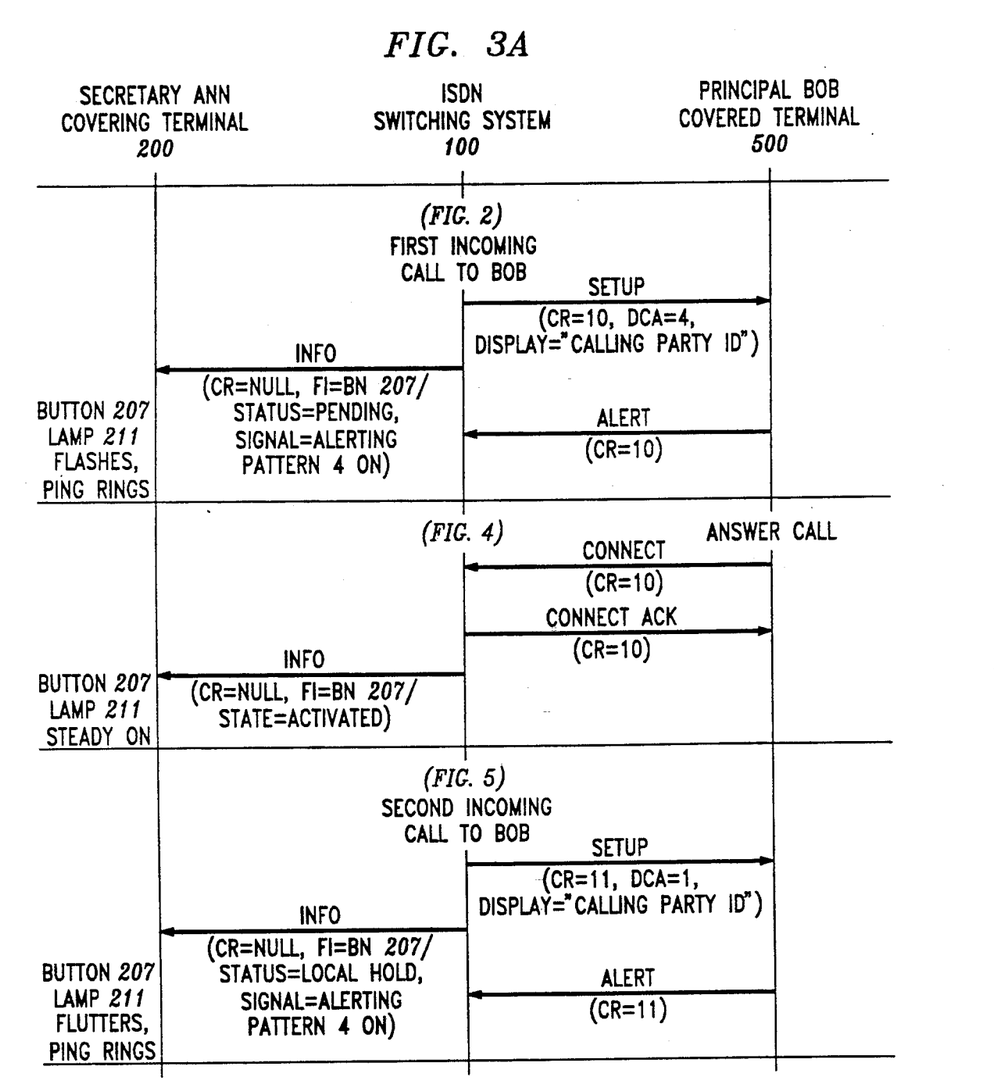
FIG. 3 is a message sequence diagram illustrating the exchange of messages between the switching system of FIG. 1 and the two terminals of FIG. 2 during an example call scenario.
Figure 3B:
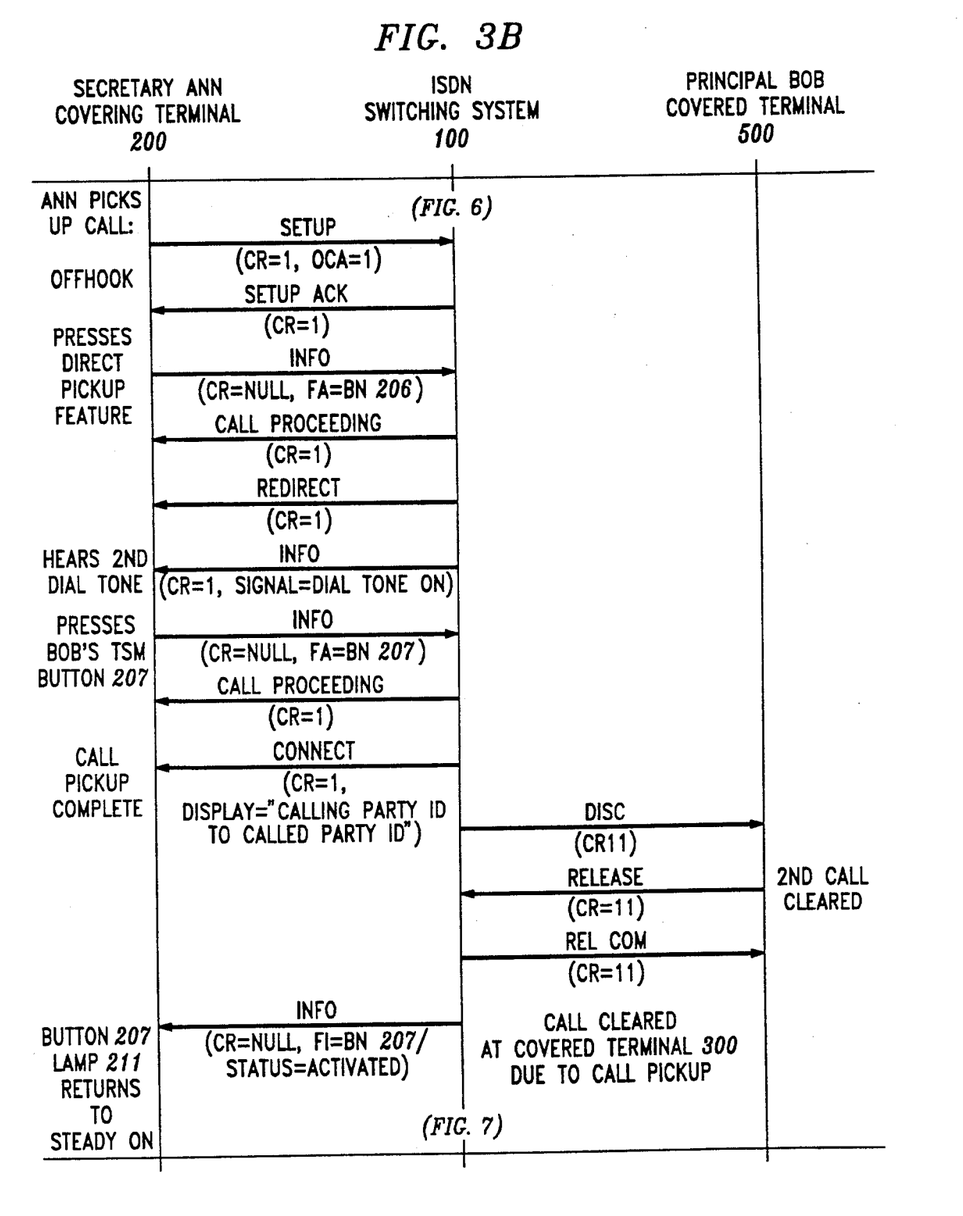
Figure 4:
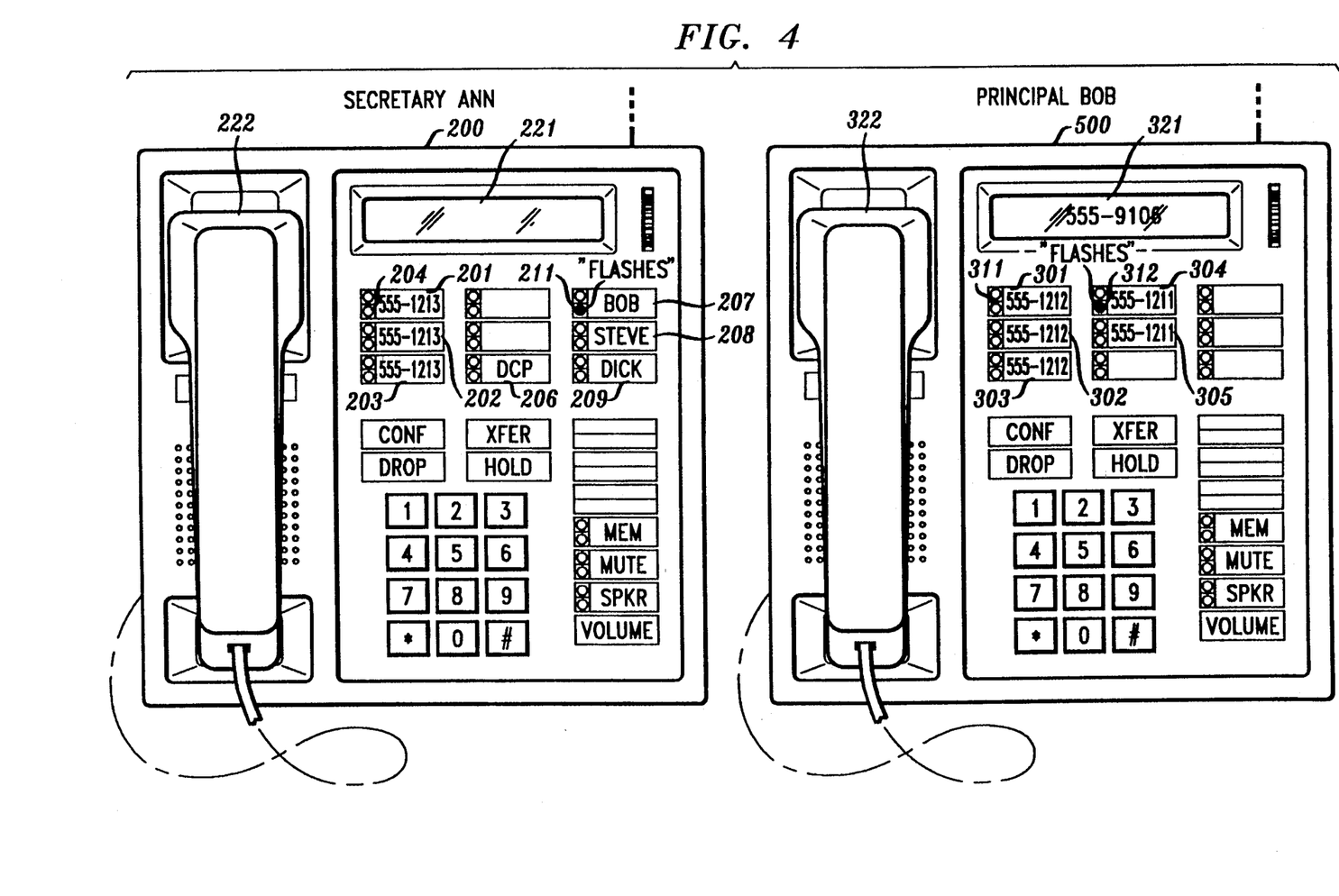
FIGS. 4–7 is a sequence of drawings showing the two terminals of FIG. 2 at various points during the call scenario of FIG. 3.
Figure 5:
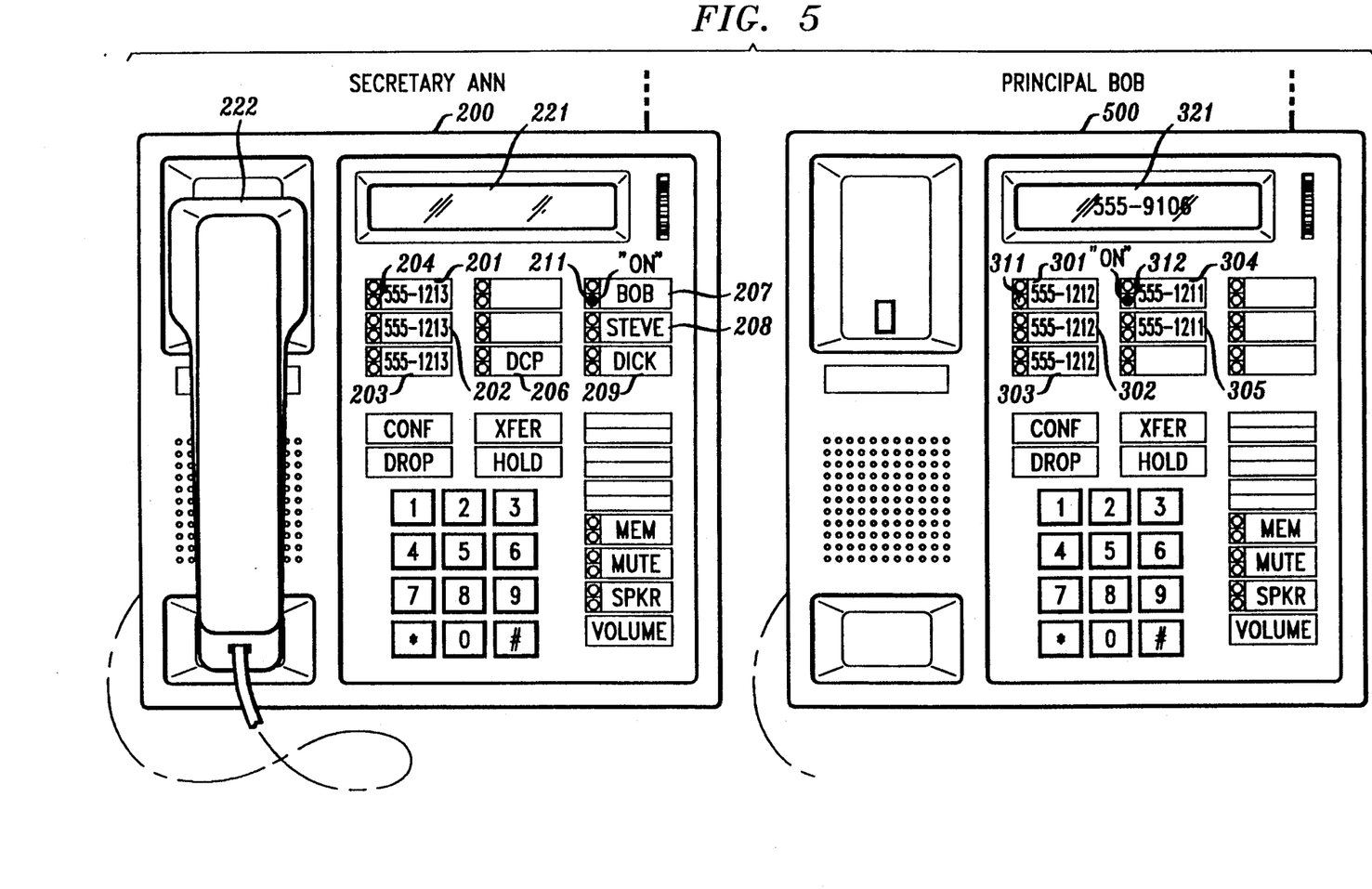
Figure 6:
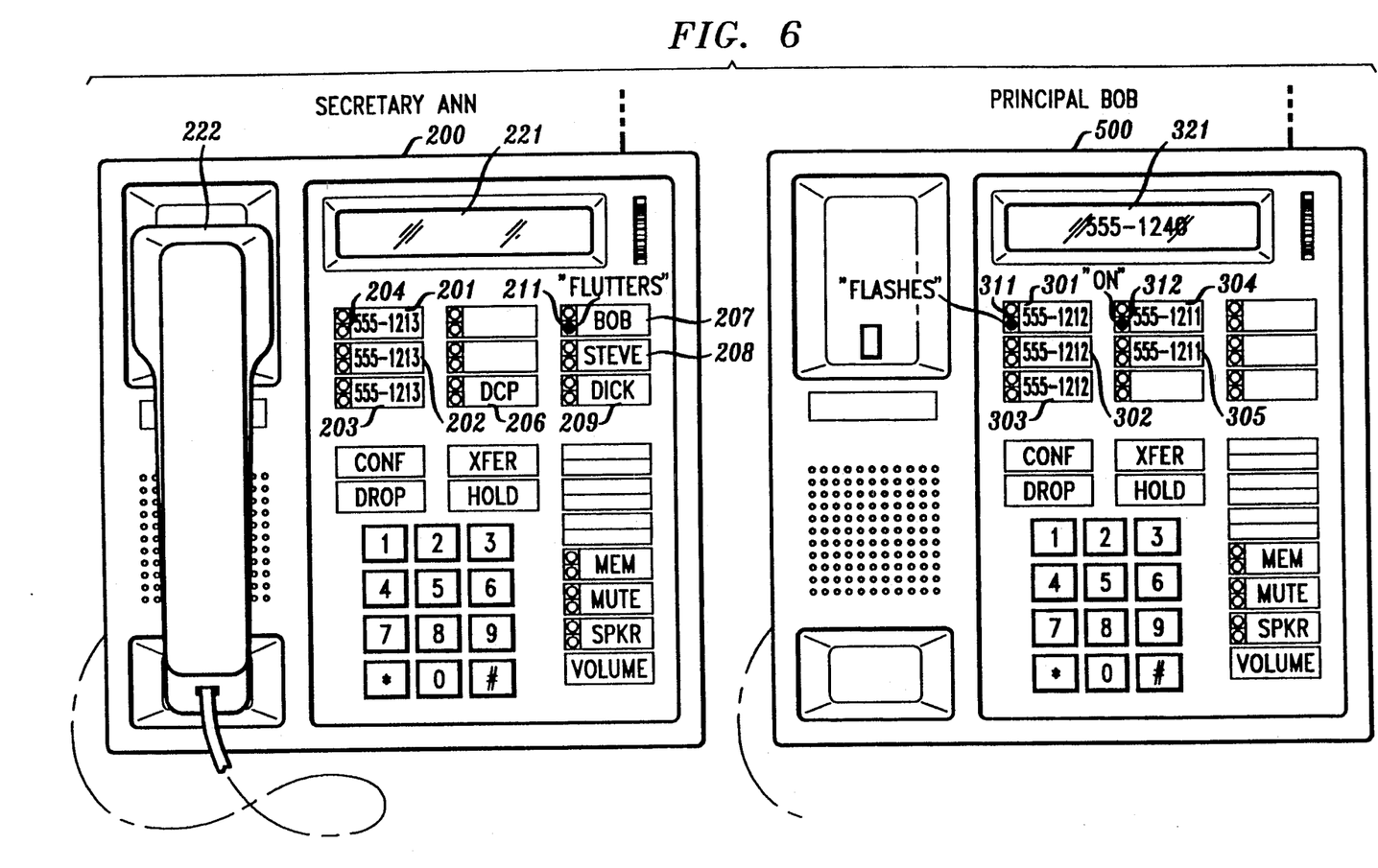
Figure 7:
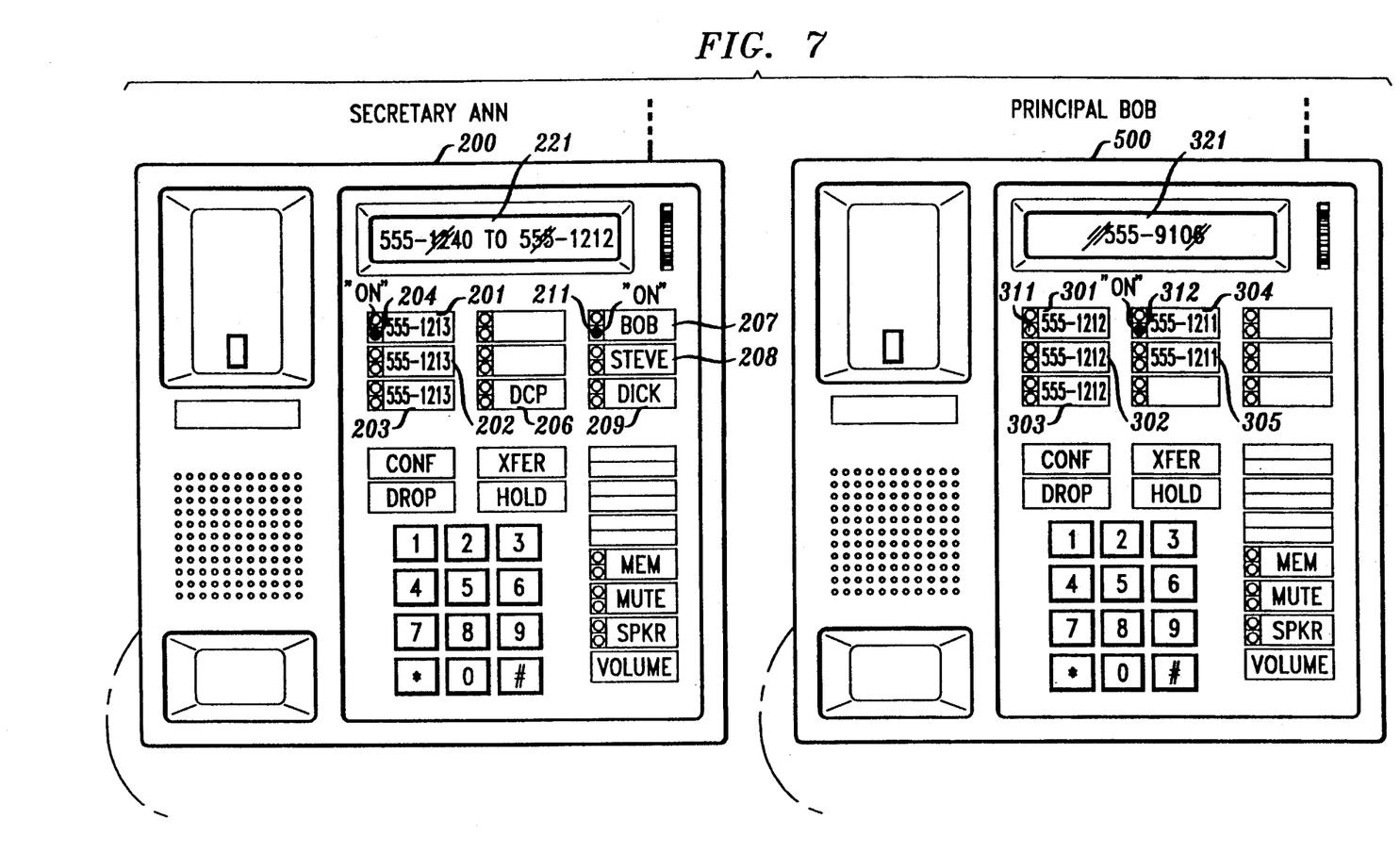

FIG. 3 is a sequence diagram for messages conveyed on the ISDN D-channel between switching system 100 and terminals 200 and 500. A first incoming call comes in for Bob on the first call appearance 304 of his personal directory number (DN) 1211 (FIG. 4). Lamp 312 flashes, the calling DN 555-9106 is displayed, and a ringing signal is generated at Bob's terminal; monitor lamp 211 flashes and a ping ring signal is generated at Ann's terminal. A calling party name could also be displayed at Bob's terminal. Bob goes off-hook and lamp 312 turns ON at Bob's terminal (FIG. 5); monitor lamp 211 turns ON at Ann's terminal. While Bob remains off-hook on the active call on call appearance 304, a second incoming call comes in for Bob on the first call appearance 301 of his DN 1212 (FIG. 6). Lamp 311 flashes, the second calling DN 555-1240 is displayed, and a ringing signal is generated at Bob's terminal; monitor lamp 211 flutters and a ping ring signal is generated at Ann's terminal. Bob notices from the displayed DN 555-1240 that it is an important client. Ann promptly picks up Bob's incoming call after the first ring by going off-hook and pressing the directed call pickup feature button 206. After receiving a second dial tone, Ann presses monitor button 207 to speed dial Bob's DN 1212. Lamp 311 goes OFF indicating that the second call is no longer incoming at Bob's terminal and the first calling DN 555-9106 is again displayed. Lamp 204 changes from flutter to steady ON and both the calling DN 555-1240 and the called DN 555-1212 are displayed on Ann's terminal (FIG. 7). Names could also be displayed. While Ann is taking the message, monitor lamp 211 goes OFF (not shown) because Bob consciously ends his less important call abruptly. Ann transfers the call back to Bob using the XFER button followed by pressing the monitor button 207 to speed dial Bob's DN 1212. After informing Bob who is calling, Ann presses the XFER button a second time to complete the transfer process. Bev and Joy both have the same capability to cover Bob's terminal if Ann is unavailable. No additional call forwarding delay would be experienced by Bev or Joy.

The ISDN Network Layer 3 messages are sequentially identified between switching system 100 and both the covering terminal 200 and the covered terminal 500 for a custom ISDN Basic Rate Interface (BRI) on an AT&T 5ESS® Switch (5ESS Switch Custom ISDN Basic Rate Interface Specification-5E8 Software Release; AT&T 235-900-343; Issue 1.0; December 1991; page IVA-27). The Feature Indication (FI) information element for a collective ringing while busy status lamp 211 is set to a status of "local hold". This would be observed as a "Steady flutter" of the green LED on an AT&T Custom terminal and would be distinguished from the "Flash" of the collective ringing while idle status indication that is the same flash as seen by a ringing call appearance on a custom ISDN telephone. In addition, the Signal information element is set to alerting pattern 4 for a brief audible alert on the covering terminal with the Call Reference (CR) set to null.

A National ISDN switch would have the same message sequence but have a different FI information element based on the 5ESS Switch National ISDN Basic Rate Interface Specification (5ESS Switch National ISDN Basic Rate Interface Specification-5E8 Software Release; AT&T 235-900-341; Issue 1.0; December 1991; page 4.1-23). The FI information element of the information message would be set to "pending" to identify the collective ringing while busy status. This would be distinguished from the "prompt" status that would be used to indicate the collective ringing while idle status.

Figure 8:
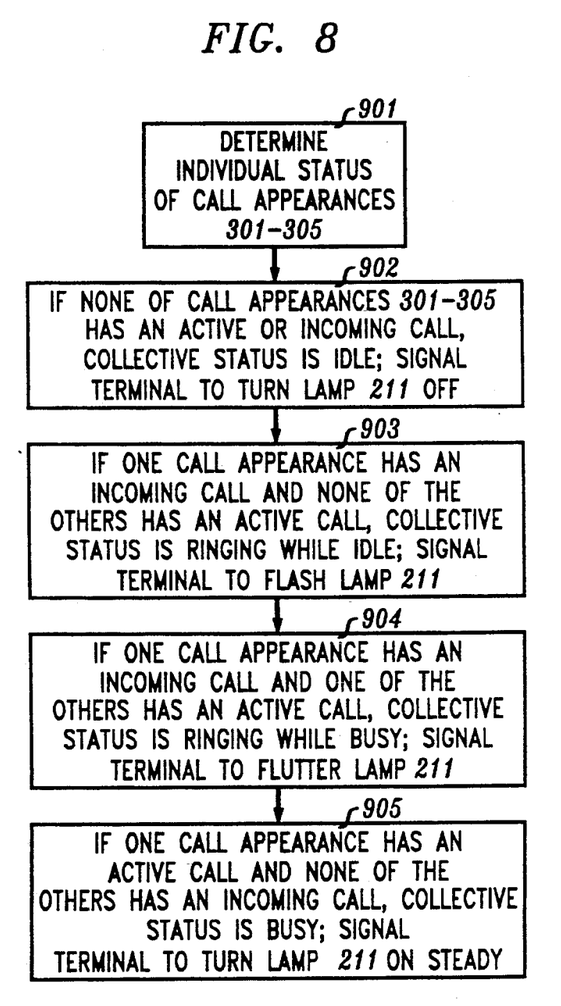
FIG. 8 is a flow chart illustration of the determination of covered terminal status by the switching system of FIG. 1.

FIG. 8 is a flow chart of the processing performed by switching system 100 to enable Ann to cover Bob's terminal. In block 901, system 100 determines the individual status of call appearances 301–305 on Bob's terminal 500. If none of the call appearances 301–305 has an active or incoming call, system 100 determines that the collective status of Bob's five call appearances is IDLE in block 902 and transmits a message to Ann's terminal causing monitor lamp 211 to turn off (if necessary). If one call appearance has an incoming call and none of the others has an active call, system 100 determines that the collective status of Bob's five call appearances is RINGING WHILE IDLE in block 903 and transmits a message to Ann's terminal causing monitor lamp 211 to flash. If one call appearance has an incoming call and one of the others has an active call, system 100 determines that the collective status of Bob's five call appearances is RINGING WHILE BUSY in block 904 and transmits a message to Ann's terminal causing monitor lamp 211 to flutter and a ping ring signal to be generated. If one call appearance has an active call and none of the others has an incoming call, system 100 determines that collective status of Bob's five call appearances is BUSY in block 905 and transmits a message to Ann's terminal causing monitor lamp 211 to be on steady. Similar messages are transmitted to Bev's terminal 300 and Joy's terminal 400.

It is to be understood that the above-described embodiment is merely illustrative of the principles of the invention and that many variations may be devised by those skilled in the art without departing from the spirit and scope of the invention. For example, rather than using flashing and fluttering lamps, other distinct visual signals may be used. It is therefore intended that such variations be included within the scope of the claims.

We claim:

1. In an arrangement for providing call coverage by a covering terminal for a covered terminal having a plurality of call appearances, said arrangement comprising an integrated services digital network (ISDN) switching system connected to said covering and covered terminals by first and second ISDN lines, respectively, where said covered terminal has a plurality of call appearances none of which is shared with any call appearance of said covering terminal, said covering and covered terminals being interconnected only via said switching system, a call coverage method for use by a switching system, said method comprising:

in response to an incoming call to said covered terminal, said switching system causing an audible alerting signal at said covered terminal and determining whether the collective status of said plurality of call appearances of said covered terminal is ringing while idle or ringing while busy, when the determined collective status is ringing while idle, said switching system causing an audible alerting signal and a first visual signal on a unique visual indicator assigned to a specific covered party at said covering terminal, both of which signals are contemporaneous with said audible alerting signal at said covered terminal, when the determined collective status is ringing while busy, said switching system causing an audible alerting signal and a second visual signal at said covering terminal, both of which signals are contemporaneous with said audible alerting signal at said covered terminal, said second visual signal being distinctive from said first visual signal, and said switching system completing said incoming call to the first one of said covered and covering terminals to answer said incoming call, where said covering terminal answers an incoming call for said covered terminal by invoking a call pickup feature.

2. In an arrangement for providing call coverage by a covering terminal for a plurality of covered terminals, each of said plurality of covered terminals having a plurality of call appearances, said arrangement comprising an integrated services digital network (ISDN) switching system connected to said covering terminal and each of said plurality of covered terminals by respective ISDN lines, where said plurality of covered terminals have a plurality of call appearances none of which is shared with any call appearance of said covering terminal, said covering and covered terminals being interconnected only via said switching system, a call coverage method for use by a switching system, said method comprising:

in response to an incoming call to any of the plurality of covered terminals, said switching system causing an audible alerting signal at each of the plurality of covered terminals called and determining for each covered terminal called whether the collective status of said plurality of call appearances thereof is ringing while idle or ringing while busy, when the determined collective status for any of the plurality of covered terminals is ringing while idle, said switching system causing an audible alerting signal and a first visual signal on a unique visual indicator assigned to a specific covered party at said covering terminal, both of which signals are contemporaneous with said audible alerting signal at the respective covered terminal called, when the determined collective status for any of the plurality of covered terminals is ringing while busy, said switching system causing an audible alerting signal and a second visual signal at said covering terminal, both of which signals are contemporaneous with said audible alerting signal at the respective covered terminal called, said second visual signal being distinctive from said first visual signal, and said switching system completing said incoming call to the first one of the called covered and covering terminals to answer said incoming call, where said covering terminal answers an incoming call for each of the plurality of covered terminals by invoking a respective call pickup feature therefor.

* * * * *